United States Patent
Wong et al.

(10) Patent No.: US 7,408,994 B1
(45) Date of Patent: Aug. 5, 2008

(54) AC COUPLING SYSTEM FOR WIDE BAND DIGITAL DATA WITH DYNAMIC AC LOAD

(75) Inventors: Thomas S. Wong, San Jose, CA (US); George W. Brown, San Jose, CA (US)

(73) Assignee: Micrel, Inc., San Jose, CA (US)

( * ) Notice: Subject to any disclaimer, the term of this patent is extended or adjusted under 35 U.S.C. 154(b) by 915 days.

(21) Appl. No.: 10/622,337

(22) Filed: Jul. 18, 2003

(51) Int. Cl.
*H04B 3/00* (2006.01)
*H04L 25/10* (2006.01)
*H03H 11/16* (2006.01)

(52) U.S. Cl. .................. 375/257; 375/318; 327/246; 327/359; 327/563

(58) Field of Classification Search .............. 375/219, 375/244, 247, 257, 318; 327/52, 246, 266, 327/274, 280, 287, 359, 563; 330/252; 333/124, 333/128, 32, 172
See application file for complete search history.

(56) References Cited

U.S. PATENT DOCUMENTS

| | | | | |
|---|---|---|---|---|
| 4,280,221 A | * | 7/1981 | Chun et al. | 375/288 |
| 4,815,106 A | * | 3/1989 | Propp et al. | 375/257 |
| 6,683,912 B1 | * | 1/2004 | Kole | 375/257 |
| 2002/0135845 A1 | * | 9/2002 | Robinson et al. | 359/189 |
| 2003/0185308 A1 | * | 10/2003 | Schoenborn | 375/257 |

OTHER PUBLICATIONS

"Micrel 5V/3.3V 3.2 Gbps High-Speed Limiting Post Amplifier", Micrel Incorporated, Copyright 2001, pp. 1-8.

* cited by examiner

*Primary Examiner*—Young T. Tse
(74) *Attorney, Agent, or Firm*—Fenwick & West LLP

(57) ABSTRACT

An interface system couples a fixed impedance device to a receiver for transmitting data signals at different data rates at different times. The interface system includes elements that are connected to provide different time constants of responsiveness to data signals of higher and lower data rates without distorting the data signals beyond usability.

24 Claims, 4 Drawing Sheets

AC COUPLING SYSTEM FOR WIDE BAND DIGITAL DATA WITH DYNAMIC AC LOAD

FIELD OF THE INVENTION

This invention relates to wide-band, broad spectrum, data communications and more particularly to an interface system for coupling a fixed impedance with a wide-band receiver operating at multiple data rates.

BACKGROUND OF THE INVENTION

Conventional communications systems typically require an interface system to couple a signal from an output device with low characteristic output impedance (e.g., about 8 to about 500 ohms) to a receiver while producing minimal signal distortion. The low impedance output may be the output of another device, such as a gigabit interface converter (GBIC), or the output of a fixed impedance transmission line, or a serializer/deserializer (SERDES), or the like. Data signals in digital communication systems are typically square waves having at least two voltage levels (e.g. 0V and 5V), transition times between the two levels (i.e. rise time, fall time), and a period that is related to the pulse width. The shorter the period and faster the transition times, the higher the data rate and the frequency of the signal. The interface system commonly provides the necessary signal modifications to the electrical characteristics of the output signal to match the input requirements of the receiver. For example, the maximum input voltage for a certain receiver may be lower than the voltage of the signal of a corresponding output device. Hence, the interface system must attenuate the signal prior to reaching the input terminals of the receiver.

Another common interface mismatch is the DC voltage component of the signal, commonly referred to as the DC offset. For example, a signal traveling through a coaxial cable is typically an AC signal referenced to the static ground or DC voltage level of the outer conductor of the coaxial cable. However, a receiver may require an input signal with a certain DC offset to provide a DC bias voltage and prevent saturation of its input state. Therefore, to overcome DC offset mismatch problems, AC or capacitive coupling interface systems are desired over direct or DC coupling systems.

Some AC coupling interface systems employ a resistive-capacitive network (RC) to couple fixed impedance output devices with receivers. The capacitive and resistive elements of the network are chosen to transmit the signal without distorting the information carried by the signal. In addition, selection of the elements should take into account the modifications to the electrical characteristics of the signal required to match the receiver input requirements. The product of the resistance times the capacitance of the RC network elements provides the RC time constant (TC) that must be selected in relation to the period of the data signal to avoid signal distortion.

Another factor to consider in the design of AC coupling interface systems is the energy transfer between the output device and the receiver. In order to transfer the maximum signal energy through the interface system from the output device to the receiver, the interface system should provide proper impedance matching between the characteristic output impedance of the output device and input impedance of the receiver. For example, in an RC network interface system, the resistive element is chosen to match the characteristic impedance of the output device, e.g. a transmission line, a GBIC, or the like. Proper impedance matching, or termination prevents signal reflections at the interface that may cause distortions (i.e. ringing). Hence, to provide proper matching to a fixed impedance device, the resistive elements of an RC network may be predetermined by the characteristic impedance of the output device. Similarly, the capacitive elements may be determined by the period of the signal, as described above, the capacitive value must be selected to provide a TC that does not cause signal distortion.

A problem arises when the data signals supplied to the receiver recur at data rates that are orders of magnitude apart, the characteristic output impedance of the output device is very low (tens to hundreds of ohms), and the receiver is configured to receive multiple standard digital data rates. For example, a high-speed signal output from an optical GBIC terminal at 2.5 Gbps and a lower-speed RS 232 signal at 9.6 Kbps may be supplied at different times to the input of a wide-band receiver through the same low impedance transmission line. In this situation, an AC coupling interface system must provide matching for the low impedance of the output device while preserving the signal data integrity, i.e. not distorting the signal. Such an interface system including an RC network and operating the very low characteristic output impedance (e.g. 50 to 100 ohms) would require an impractical, prohibitively high value capacitive element to maintain a reasonable RC time constant that does not distort the lower frequency signal beyond practical use.

SUMMARY OF THE INVENTION

In accordance with an illustrated embodiment of the present invention, an interface system is provided that enables digital data signals of different data rates to be transmitted at different times from a low impedance node to a broadband, wide-spectrum receiver through a dynamic load. The interface system allows transmission of low data rate signals and high data rate signals with minimal resultant signal distortion using capacitive elements of practical size.

DETAILED DESCRIPTION OF THE INVENTION

Figure 1:
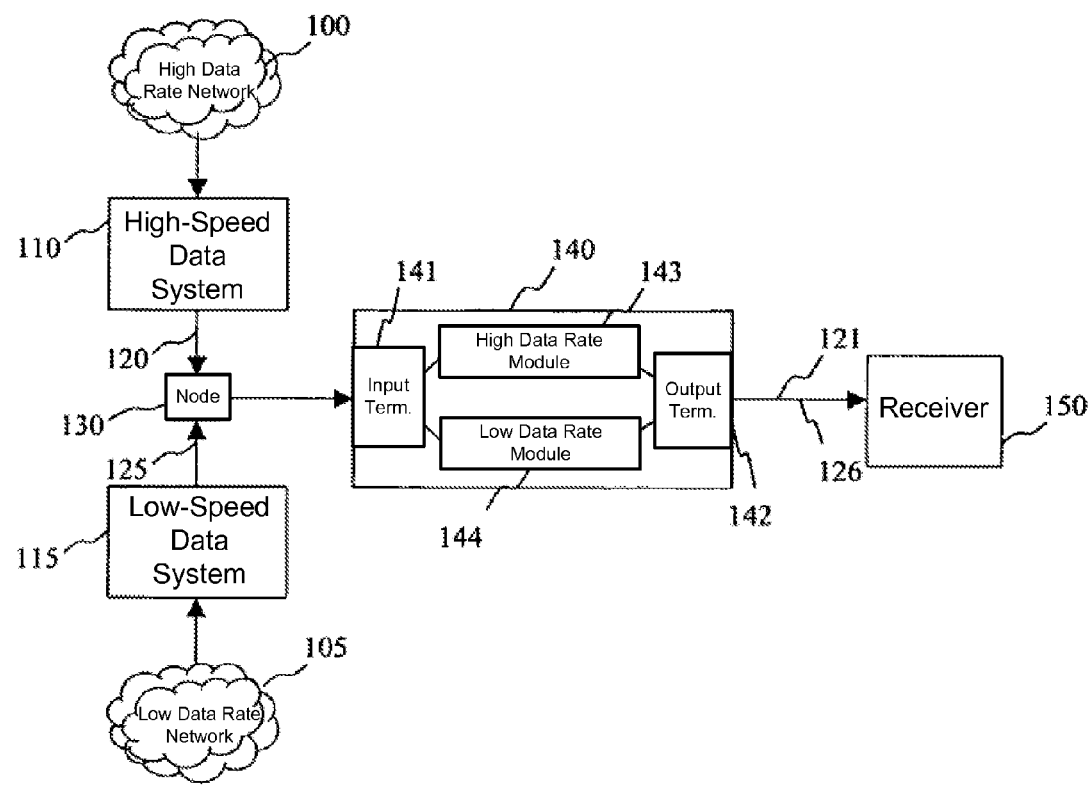
FIG. 1 is a high level block diagram of a system incorporating an interface system according to the present invention.

Referring now to FIG. 1, there is shown a block diagram of a system incorporating an interface system 140 according to the present invention. Two data networks, a high data rate network 100 and a low data rate network 105 are shown. In one embodiment, high data rate network 100 may be a Gigabit Ethernet network. Alternatively, high data rate network 100 may be a SONET/SDH fiber network, or some other fiber-optic network operating at high data rates (e.g. 531 Mbps, 1062 Mbps, 2.5 Gbps, or the like). It should be noted that the present invention may operate with other high data rate networks (e.g. in the Megabit to multiple Gigabit per second range) now existing or as may be developed in the future. Similarly, the low data rate network 105 may be any data network communicating according to one of several network protocols or standards that use a data rate or frequency that is orders of magnitude smaller than the high data rate network (e.g. in the Kilobit-per-second range). For example, the low data rate network 105 may transmit data at approximately 9.6 Kbps according to an ELA/TIA RS-232 protocol, or a CCITT data protocol (e.g. X.21, V.24).

High data rate network 100 supplies high data rate signals to high speed data system 110 and low data rate network 105 supplies low data rate signals to low speed data system 115 each at their respective operating data rate. High-speed data system 110 receives high data rate data signals from the high data rate network 100 and after some processing supplies high data rate signal 120 to node 130. Low-speed data system 115 receives low data rate data signals from the low data rate network 105 and after some processing supplies low data rate signal 125 to node 130. In one embodiment, high data rate signal 120 and low data rate signal 125 may be digital signals in the form of a square waves encoding data using a pulse or pulse width modulation scheme, however, other wave forms and modulation schemes may be used (e.g. amplitude modulation, phase shift keying, quadrature phase shift keying, and the like).

Similarly, in one embodiment, high-speed data system 110 may be a terminal device, such as, a GBIC Terminal for optical data communications, a high speed multiplexer, a demultiplexer, a high speed SERDES, or the like. In an alternative embodiment, high-speed data system 110 may be a fixed impedance transmission line (e.g. 50-ohm or 75-ohm coaxial cable, twisted pair cable, stripline, microstripline, a printed circuit board (PCB) controlled impedance trace, or the like). Likewise, in one embodiment, low-speed data system 115 may be a terminal device, such as data communication equipment (DCE) (e.g. a data modem), or may be a fixed impedance transmission line. The physical conductors of the data signals, high data rate data signal 120 and low data rate data signal 125, are merged at a node 130. Node 130 may be any device capable of merging the paths of data signals of different data rates that are supplied to the node 130 at different times, for example, a two-input-one-output cable connector, or a multiplexer, or a SERDES, or a hub, or the like. It should be noted that there are many other devices capable of merging the paths of data signals of different data rates that could be used in alternative embodiments of the present invention. Further, in one embodiment of the present invention, data systems 110 and 115 and node 130 may all be combined into one device or system. For example, in one embodiment, high data rate network 100 and low data rate network 105 may share the same physical infrastructure and data systems 110 and 115 are part of that shared infrastructure. Then, node 130 may be a fixed impedance transmission line (e.g., 50-ohm or 75-ohm coaxial cable, twisted pair cable, stripline, microstripline, a printed circuit board (PCB) controlled impedance trace, or the like) carrying both data signals 120 and 125 supplied at different times to interface system 140. It should be noted that node 130 supplies the signals of different data rates to the interface system 140 at different times, i.e. high data rate signal 120 is not combined with low data rate signal 125 because they only travel through the connection between node 130 and interface system 140 at different times.

Data signals 120 and 125 supplied to node 130 become the corresponding input signals 121 and 126 supplied to receiver 150 after undergoing modifications through interface system 140. Interface system 140 connects the output of the node 130 to the receiver 150 and modifies electrical characteristics of the signals to convert data signals 120 and 125 into corresponding data signals 121 and 126 while preserving the data. Data signals 121 and 126 carry the same data as signals 120 and 125 but are compatible with the input requirements of receiver 150. The modifications of electrical characteristics may include, without limitation, alter DC offset voltage, limit maximum peak voltage, or change current. For example, in one embodiment of the present invention, interface system 140 may provide AC coupling to change the DC offset of the data signals from a 0V ground level to a certain DC bias voltage required for the proper operation of an input state of receiver 150.

Interface system 140 has an input terminal 141 that receives at different times the data signals 120 and 125 from node 130. The input terminal is connected to a high data rate module 143 and a low data rate module 144. High data rate signal 120 appearing at the input terminal 141 is transmitted through the high data rate module 143 which performs the necessary electrical characteristic modifications to meet the input requirements of receiver 150. High data rate module 143 is configured to process the high data rate signal 120 into high data rate signal 121 without losing data integrity, i.e. without distorting the high data rate signal 120 beyond usability. Similarly, low data rate signal 125 appearing at the input terminal 141 is transmitted through the low data rate module 144 which performs the necessary electrical characteristic modifications to meet the input requirements of receiver 150. Low data rate module 144 is configured to process the low data rate signal 125 into low data rate signal 126 without losing data integrity, i.e. without distorting the low data rate signal 125 beyond usability. High data rate module 143 and low data rate module 144 are connected to the output terminal 142 of the interface system 140 to transmit the modified data signals 121 and 126 to the receiver 150. In one embodiment of the present invention, the high data rate module 143 and low data rate module 144 may be combined into a single dual function module such as, for example, an RC network. In alternative embodiments, receiver 150 may be a wide-band receiver, a high-speed post amplifier, a differential amplifier, or the like. For example, receiver 150 may be an SY88993AV (available from Micrel, Inc. of San Jose, Calif.) with an input frequency range of approximately 0 to 2.5 GHz.

Further, the system illustrated in FIG. 1 may comprise more than two data networks. For clarity of explanation, embodiments with only two data signals from two data networks are described. However, it should be noted that the same principles apply to a third, fourth, and multiple numbers of data signals, each with a different data rate.

Figure 2A:
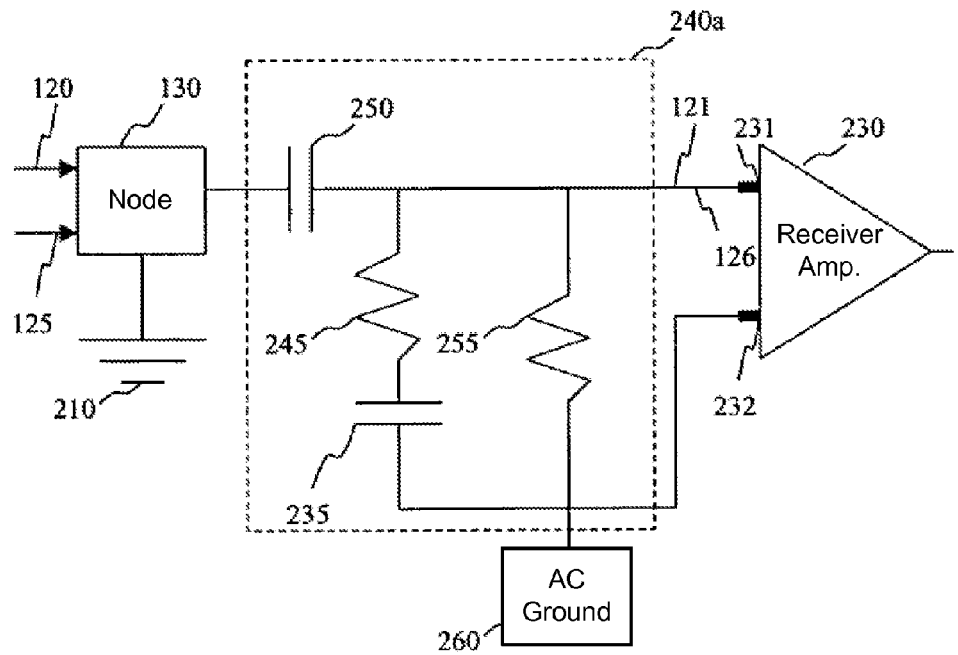
FIG. 2A is a schematic diagram of one embodiment of a circuit for implementing an AC coupling system according to the present invention.
Figure 2B:
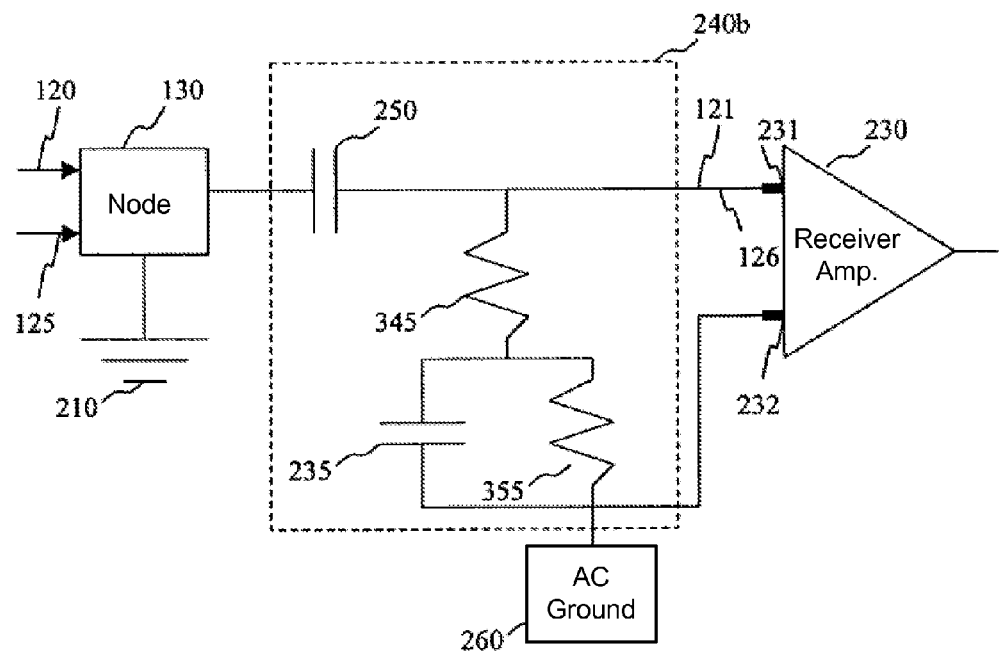
FIG. 2B is a schematic diagram of one embodiment of a circuit for implementing an AC coupling system according to the present invention

Now referring to FIGS. 2A and 2B, two embodiments of the interface system 140 are shown at the circuit level. Node 130 is represented in the embodiment shown in FIGS. 2A and 2B as a grounded, single ended, output device such as, for example, a fixed impedance transmission-line (e.g. a 50 or 75 ohm coaxial cable, or a 100-ohm twisted pair cable, or the like). Interface system 140 is represented by two different embodiments of similar functionality but slightly different arrangement of elements, RC network interface systems 240a and 240b. RC network interfaces 240a and 240b receive data signals 120 and 125 from node 130, modify the electrical characteristics of data signals 120 and 125, and supplies to the receiver input 231 corresponding data signals 121 and 126 that meet the input requirements of receiver 230. In one embodiment shown in FIG. 2A, RC network interface system 240a is an AC coupling interface system including an RC network in a high-pass configuration. Capacitive element 250 connects the node 130 to receiver input 231 of receiver amplifier 230 and to one node of the parallel combination of resistive element 255 and the series combination of resistive element 245 and capacitive element 235. The other node of parallel combination of resistive element 255 and the series combination of resistive element 245 and capacitive element 235 is connected to AC ground 260 and to the other input 232 of receiver amplifier 230. In one embodiment, AC ground 260 may be a DC bias network that provides a biasing DC voltage at the input of receiver amplifier 230 at a level centered within the input common mode range of the input stage of amplifier 230. AC ground 260 thus provides the necessary DC offset to the input of receiver amplifier 230 following the capacitive decoupling of the DC component of the applied signals.

The product of the component values of the capacitive element 235 and resistive element 245 determine a fast RC time constant (TC) of the RC network interface system 240a. Similarly, capacitive element 250 and resistive element 255 determine a long RC time constant of the RC network interface system 240a. As described above, the principles of the invention can be extended for operation with more than two different signal data rates. Accordingly, in other embodiments other time constants may be required for the operation of the RC network interface system 240a with more data signals at different data rates. To provide the necessary time constants, series combinations of resistive and capacitive elements (similar to the connection of elements 245 and 235) can be connected in parallel with resistive element 255 as additional branches.

The short time constant, which is determined by capacitive element 235 and resistive element 245, controls the response of the RC network interface system 240a to the rising and falling edges of the square wave form of the high data rate signal 120. The rising and falling edges of the square wave data signals comprise dominant high frequency components. A resistive element 245 that establishes the fast RC time constant is selected to closely match the fixed impedance of the node 130 (e.g. 50 or 75 ohm transmission line, microstripline, 100 ohm twisted pair, or the like) and the capacitance of capacitive element 235 is selected to permit charging approximately as fast as the rise time of the square wave form of the high data rate signal. Similarly, the long time constant determined by capacitive element 250 and resistive element 255 controls the response of the RC network interface system 240a on applied signals of low data rates. Low data rate signals are more dominantly characterized by a longer pulse width or period than the pulse width or period of high data rate signals. In order to avoid distortion of the data in applied low data rate signals, the capacitance of capacitive element 250 is selected to hold the charge from the applied data signals for a period longer than the period of the applied low data rate signals. In addition, the resistance value of resistive element 255 is selected to provide a discharge path for capacitive element 250 over a time-constant interval longer than the width or period of an applied low data rate signal, thereby providing the long TC for RC network interface system 240a.

The selection of the elements in the RC network interface system 240a may be guided by the following relationships. The value of resistive element 255 should be selected to be much higher resistance than the value of the resistive element 245 and therefore form a much longer, slower, or larger time constant with capacitive element 250 than the shorter, faster, or smaller time constant determined by capacitive element 235 and the lower-value resistive element 245. In addition, capacitive element 250 is selected to have much higher capacitance than capacitive element 235. Hence, capacitive element 235 discharges a significant percentage of its charge through the lower-value resistive element 245 long before the higher-value capacitive element 250 loses a significant percentage of its greater charge. The RC network interface system 240a thus behaves as a dynamic AC load. Specifically, the AC load is the low impedance termination of the resistive element 245 (that matches the fixed impedance of the node 130) for high data rate signals, and the AC load is the high impedance provided by resistive element 255 and capacitive element 250 for low data rate signals. It should be noted that the AC ground 260 may be a biasing network that sets the proper DC bias voltage in combination with resistive element 255 for the receiver amplifier 230.

In one embodiment of the present invention, the capacitive element 235 is about 0.1 uF and resistive element 245 is about 50 ohms. Similarly, capacitive element 250 is about 5 uF and resistive element 255 is about 50 K-ohms. In this exemplary embodiment, capacitive element 250 has 50 times more capacitance than capacitive element 235, and the resistance of resistive element 255 is three orders of magnitude larger than resistive element 245. These values provide a short TC of 5 microseconds and a long TC of 250 milliseconds for operation on a low data rate signal having a period that may be approximately 50000 times longer than the period of a high data rate signal to provide an effective AC coupling interface system for a 50-ohm transmission line carrying 2.5 Gbp and 9.6 Kbps data signals to a wide band receiver 230.

Now referring to FIG. 2B, another embodiment of the present invention is shown in which RC network interface system 240b has a different arrangement of elements as compared to RC network interface system 240a. However, RC network interface system 240a and 240b are functionally equivalent and the same operating principles described above with reference to FIG. 2A apply to the RC network interface system 240b shown in FIG. 2B. Capacitive element 250 is connected to supply input data signals 121 and 126 to one input terminal 231 of receiver amplifier 230 and to resistive element 345, which is connected to one node of the parallel combination of capacitive element 235 and resistive element 355. The parallel combination is connected to AC ground 260 and to the other input 232 of receiver amplifier 230.

In this embodiment resistive element 355 has a much larger resistance value than resistive element 345, and capacitive element 250 has larger capacitance than capacitive element 235. The long TC is the product of capacitive element 250 and the sum of resistive elements 345 and 355.

Figure 3:
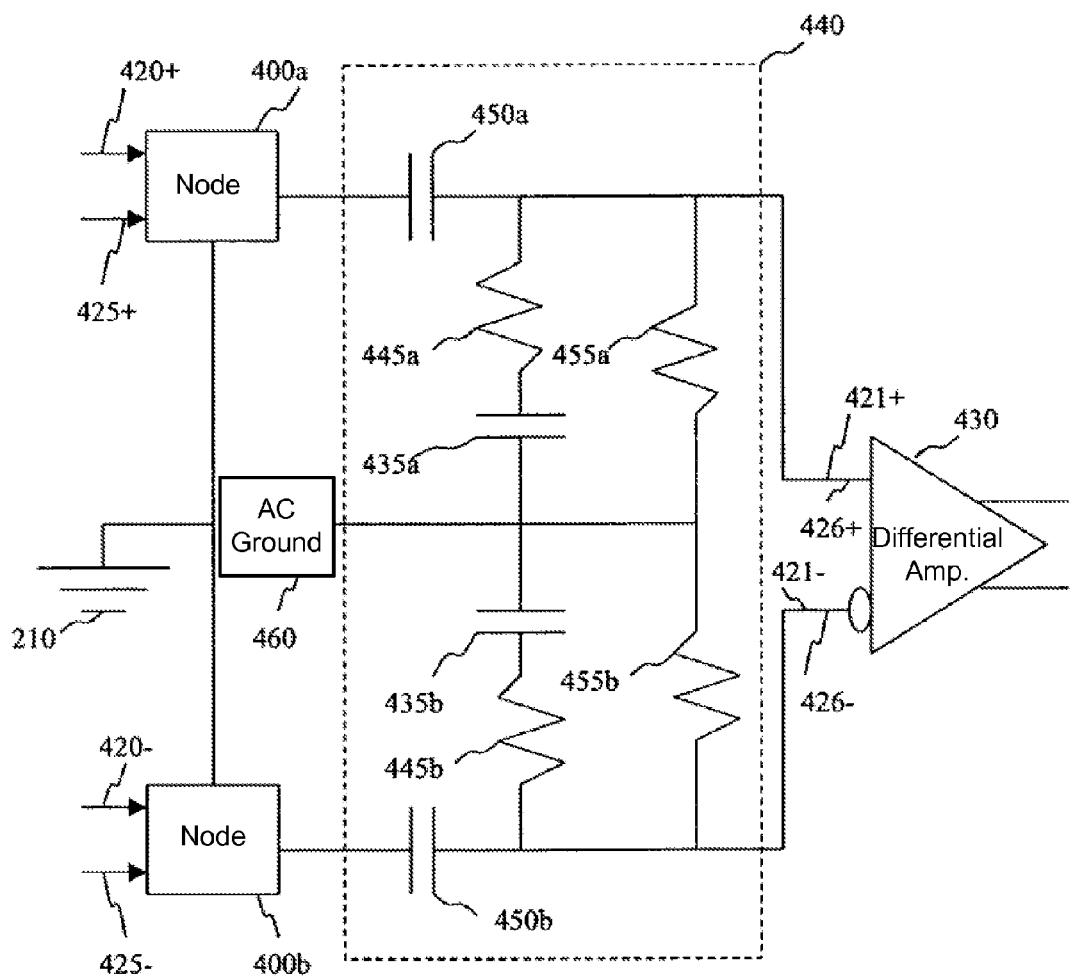
FIG. 3 is a schematic diagram of an alternative embodiment of a double-ended AC coupling system according to the present invention.

FIG. 3 shows an alternative embodiment of the present invention of a differential interface system 440 including an RC network in a differential circuit topology. Signals 420+/420− and 425+/425− are differential data signals that define the data in the difference between the two signals. Differential signal 420+/420− is high data-rate signal and differential signal 425+/425− is a low data-rate signal. Advantages of using differential circuit topologies include, without limitation, robustness against common mode noise and crosstalk, faster data transfer, reduced electromagnetic interference (EMI), and thermal drift. Differential signals 420+/420− and 425+/425− are transmitted from nodes 400a and 400b to differential amplifier 430 through the differential interface system 440. In one embodiment, node 400a is a fixed impedance transmission line carrying one side of the two differential signals, i.e., the positive polarity side, 420+ and 425+, and node 400b is a second fixed impedance transmission line carrying the other side of the two differential signals, i.e., the negative polarity side, 420− and 425−.

Differential interface system 440 converts applied signals 420+/420− and 425+/425− into output signals 421+/421− and 426+/426− that are compatible with the input requirements for differential amplifier 430. Elements 450a, 445a, 455a, and 435a are a differential half-circuit that provides the AC coupling described above with reference to FIG. 2A for one side of the differential signals (i.e., the positive polarity sides, 420+ and 425+), and elements 450b, 445b, 455b, and 435b are the other differential half-circuit that provides similar AC coupling for the opposite side of the differential signal (i.e., the negative polarity sides, 420− and 425−). In this embodiment, AC ground 460, in addition to the DC bias voltage described above also provides correction for any DC offset mismatch between the two branches of the differential signal that may occur upon conversion from a single-ended to a double-ended differential signal.

Figure 4:
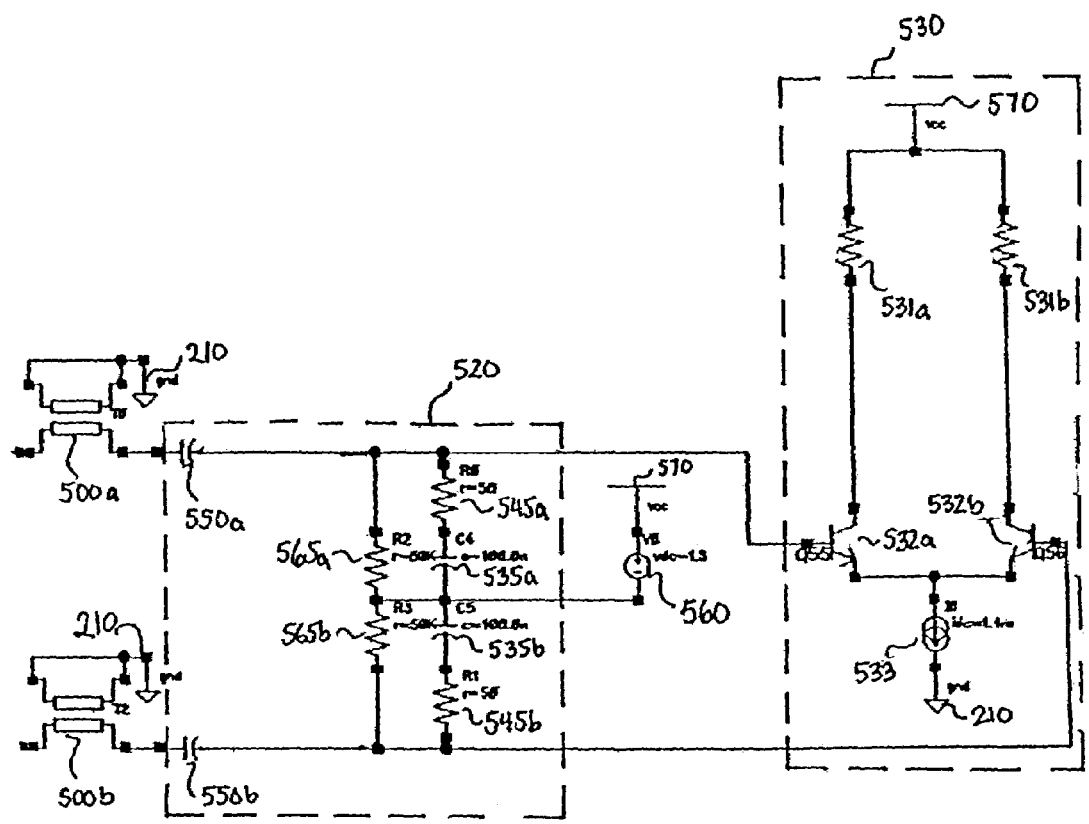
FIG. 4 is a circuit schematic of one embodiment of the present invention for operation on differential applied signals.

Now referring to FIG. 4, there is shown a schematic diagram of a differential circuit topology according to the principles of the present invention. The embodiment shown in FIG. 4 is particularly optimized for operation with data signals at about 9.6 Kbps and 2.5 Gbps data rates, with square waves having about 80 pico-second through 100 nano-second transition times. Transmission lines 500a and 500b are connected to the differential RC network interface system 520 that AC couples the applied data signals to differential amplifier stage 530. Transmission lines 500a and 500b are referenced to ground 210. Differential amplifier stage 530 includes two transistors 532a and 532b biased by collector resistors 531a and 531b and current source 533. To maintain the inputs to transistors 532a and 532b within the common mode range, voltage source 560 provides a reference of about 1.3 Volt DC bias voltage and also provides an AC ground for the data signals.

In this embodiment, capacitors 550a and 550b are connected to apply the input differential data signals from the transmission lines 500a and 500b to the nodes formed as the common connections of the bases of transistors 532a and 532b, the resistors 565a and 565b, and the resistors 545a and 545b that are each connected in series with capacitors 535a and 535b. Resistors 565a and 565b have a resistance of about 50 K-ohm and resistors 545a and 545b have a resistance of about 50 ohm. Capacitors 550a and 550b have a capacitance of about 5 uF and capacitors 535a and 535b have a capacitance of about 100 nF and are connected to the reference node of voltage source 560 and to resistors 565a and 565b. Voltage source 560 supplies the system bias voltage 570 (Vcc). In this embodiment, the combinations of capacitors 535a and 535b with resistors 545a and 545b determine the short time constants for each branch of the differential signals. These time constants control the response of the interface system 520 to the 2.5 Gbps data signals with the associated square wave transitions. Similarly, the long time constants for each branch of the differential signals are determined by the combination of capacitors 550a and 550b with the large-value resistors 565a and 565b. These time constants control the response of the interface system 520 to the 9.6 Kbps data signals with longer periods between square wave transitions.

Therefore, in the embodiment shown in FIG. 4, the 2.5 Gbps differential signal is applied across the 50-ohm load of resistors 545a and 545b and charges capacitors 535a and 535b. For the 9.6 Kbps differential signal, an applied data signal pulse charges capacitors 550a and 550b that are slowly discharged through the 50 K-ohm resistors 565a and 565b. Thus, in the embodiment of FIG. 4, the interface system couples transmission lines 500a and 500b to differential amplifier stage 530 for 2.5 Gbps and 9.6 Kbps signals without significant distortion of the usable data signal waveforms.

What is claimed is:

1. An interface system between a fixed impedance node and a wide-band receiver for converting data signals of different data rates to converted data signals adapted for the wide-band receiver, the interface system comprising:

a first set of elements connected between the fixed impedance node and the wide-band receiver for converting first data signals at a first data rate during a first time period to first converted data signals adapted for the wide-band receiver, the first set of elements providing a first time constant response to the first data signals; and a second set of elements connected between the fixed impedance node and the wide-band receiver for converting second data signals at a second data rate during a second time period to second converted data signals adapted for the wide-band receiver, the second set of elements providing a second time constant response to the second data signals.

2. The interface system of claim 1 wherein the first set of elements and the second set of elements have one or more elements in common.

3. The interface system of claim 2 wherein the one or more elements in common decouple a DC voltage associated with the first and second data signals.

4. The interface system of claim 2 wherein the first set of elements comprises a first capacitor connected between the fixed impedance node and a first input of the wide-band receiver, and a first resistor having one end connected between the first capacitor and the first input of the wide-band receiver, the other end of the first resistor connected to an AC ground; and wherein the second set of elements comprises the first capacitor, a second capacitor connected to the AC ground and a second input of the wide-band receiver, and a second resistor connected between the first capacitor and the second capacitor.

5. The interface system of claim 2 wherein the first set of elements comprises a first capacitor connected between the fixed impedance node and a first input of the wide-band receiver, a first resistor having one end connected to the first capacitor and the first input of the wide-band receiver, the other end of the first resistor connected to a second resistor connected between the first resistor and an AC ground; and wherein the second set of elements comprises the first capacitor, the first resistor and a second capacitor connected between the first resistor and a second input of the wide-band receiver, and the second capacitor in parallel with the second resistor.

6. The interface system of claim 1 wherein the first and second data signals are differential signals and the interface system has a differential circuit topology.

7. An AC coupling interface system coupling a low impedance transmission line to an amplifier for non-simultaneous transmission of digital data signals at different data rates between a fixed impedance transmission line and the amplifier for converting the non-simultaneous digital data signals of the different data rates to converted digital data signals adapted for the amplifier, the AC coupling interface system comprising:

a first capacitive element connected to the fixed impedance transmission line for receiving the digital data signals, the first capacitive element connected to a first input of the amplifier;

a first resistive element having one end connected to the first capacitive element and the first input of the amplifier, the other end of the first resistive element connected to a second input of the amplifier and to a reference voltage source, the first resistive element in conjunction with the first capacitive element providing a first time constant response to first digital data signals at a first data rate; and a second resistive element connected between the first capacitive element and a second capacitive element, the second capacitive element connected to the reference voltage source and the second input of the amplifier, the second resistive element in conjunction with the second capacitive element providing a second time constant response to second digital data signals at a second data rate.

8. The AC coupling interface system of claim 7 wherein the first capacitive element has a larger capacitance than the second capacitive element and the first resistive element has a larger resistance than the second resistive element.

9. The AC coupling interface system of claim 8 wherein the first data rate is approximately 9.6 Kilobits per second and the second data rate is approximately 2.5 Megabits per second.

10. The AC coupling interface system of claim 7 wherein the fixed impedance transmission line is one of the group consisting of a 50-ohm coaxial cable, a 75-ohm coaxial cable, a stripline, a microstripline, and a printed circuit board (PCB) controlled impedance trace.

11. The AC coupling interface system of claim 10 wherein the second resistive element provides impedance matching for the fixed impedance transmission line.

12. A differential AC coupling network between nodes providing differential digital data signals and a differential amplifier for converting the differential digital data signals of different data rates to converted digital data signals adapted for the differential amplifier, comprising:
   a first input capacitor connected between a first node and a first input of the differential amplifier, the first input capacitor providing DC voltage isolation for signals from the first node;
   a second input capacitor connected between a second node and a second input of the differential amplifier, the second input capacitor providing DC voltage isolation for signals from the second node;
   a first load resistor connected between the first input capacitor and a reference voltage source, the first load resistor in combination with the first input capacitor providing a first time constant response to first differential digital data signals at a first data rate during a first time period;
   a second load resistor connected between the second input capacitor and the reference voltage source, the second load resistor in combination with the second input capacitor providing the first time constant response to the first differential digital data signals at the first data rate during the first time period;
   a first series combination of a first matching resistor and a first matching capacitor connected between the first input capacitor and the reference voltage source, the first series combination providing a second time constant response to second differential digital data signals at a second data rate during a second time period; and
   a second series combination of a second matching resistor and a second matching capacitor connected between the second input capacitor and the reference voltage source, the second series combination providing the second time constant response to the second differential digital data signals at the second data rate during the second time period.

13. The differential AC coupling network of claim 12 wherein the first and second nodes are fixed impedance transmission lines.

14. The differential AC coupling network of claim 12 wherein the differential amplifier is an input stage of a wide-band receiver.

15. The differential AC coupling network of claim 12 wherein each of the first and second matching resistors has a lower resistance value than the first and second load resistors.

16. The differential AC coupling network of claim 12 wherein each of the first and second matching resistors has a resistance of approximately 50 ohms.

17. An interface system between a fixed impedance node and a wide-band receiver for converting digital data signals of different data rates to converted digital data signals adapted for the wide-band receiver, comprising:
   means for converting first digital data signals at a first data rate from the fixed impedance node to first converted digital data signals adapted for the wide-band receiver during a first time period, and providing a first time constant response to the first digital data signals; and
   means for converting second digital data signals at a second data rate from the fixed impedance node to second converted digital data signals adapted for the wide-band receiver during a second time period, and providing a second time constant response to the second digital data signals.

18. The interface system of claim 17 wherein the first and second digital data signals are differential signals and the interface system has a differential circuit topology.

19. The interface system of claim 17 further comprising means for isolating a DC voltage from the fixed impedance node to the wide-band receiver.

20. The interface system of claim 19 further comprising means for providing a reference DC bias voltage to the wide-band receiver.

21. The interface system of claim 17 wherein the first data rate is approximately 2.5 Megabits per second and the second data rate is approximately 9.6 Kilobits per second.

22. The interface system of claim 17 wherein the means for converting the first digital data signals further comprises means for matching an output impedance of the fixed impedance node.

23. A method of converting digital data signals of different data rates received from a fixed impedance node to converted digital data signals adapted for a wide-band receiver, the method comprising:
   generating first converted digital data signals by an AC coupling network using a first time constant response of the AC coupling network in response to receiving first digital data signals at a first data rate from the fixed impedance node, the first time constant response configured to reduce or eliminate distortions in the first converted digital data signals; and
   generating second converted digital data signals by the AC coupling network using a second time constant response of the AC coupling network in response to receiving second digital data signals at a second data rate from the fixed impedance node, the second time constant response configured to reduce or eliminate distortions in the second converted digital data signals.

24. The method of claim 23 further comprising matching an output impedance of the fixed impedance node with the AC coupling network for a maximum power transfer of the first and second digital data signals.

* * * * *

UNITED STATES PATENT AND TRADEMARK OFFICE
CERTIFICATE OF CORRECTION

PATENT NO. : 7,408,994 B1
APPLICATION NO. : 10/622337
DATED : August 5, 2008
INVENTOR(S) : Thomas S. Wong and George W. Brown It is certified that error appears in the above-identified patent and that said Letters Patent is hereby corrected as shown below:

Column 8, line 41, after "capacitor," insert --coupled--.

Signed and Sealed this

Sixth Day of January, 2009

JON W. DUDAS
*Director of the United States Patent and Trademark Office*